United States Patent
Kidder et al.

(10) Patent No.: US 8,385,384 B1
(45) Date of Patent: Feb. 26, 2013

(54) SYSTEM, METHOD AND APPARATUS FOR SELECTING FREQUENCY HOPPING SEQUENCES

(75) Inventors: Kenneth Kidder, Coon Rapids, MN (US); Steven Nichols, Maple Grove, MN (US); Robert Juntunen, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 1167 days.

(21) Appl. No.: 12/253,772

(22) Filed: Oct. 17, 2008

(51) Int. Cl.
*H04B 1/00* (2006.01)

(52) U.S. Cl. ....................................................... 375/133

(58) Field of Classification Search .................. 375/132
See application file for complete search history.

(56) References Cited

U.S. PATENT DOCUMENTS

| | | | |
|---|---|---|---|
| 5,463,659 A | 10/1995 | Nealon et al. | |
| 5,758,290 A | 5/1998 | Nealon et al. | |
| 5,927,599 A | 7/1999 | Kath | |
| 6,028,885 A | 2/2000 | Minarik et al. | |
| 6,195,712 B1 * | 2/2001 | Pawlowski et al. | 710/19 |
| 6,213,404 B1 | 4/2001 | Dushane et al. | |
| 6,700,920 B1 | 3/2004 | Partyka | |
| 6,778,902 B2 | 8/2004 | Hathiram et al. | |
| 6,859,450 B1 | 2/2005 | Mansfield | |
| 6,870,875 B1 | 3/2005 | Partyka | |
| 6,925,105 B1 | 8/2005 | Partyka | |
| 7,050,906 B2 | 5/2006 | Hathiram et al. | |
| 7,224,713 B2 | 5/2007 | Partyka | |
| 7,301,986 B2 | 11/2007 | Partyka | |
| 7,330,736 B2 * | 2/2008 | Redi | 455/553.1 |
| 2003/0198245 A1 * | 10/2003 | Bradford et al. | 370/445 |
| 2005/0047383 A1 | 3/2005 | Yoshida | |
| 2006/0227852 A1 | 10/2006 | Black et al. | |
| 2007/0291822 A1 * | 12/2007 | Staley et al. | 375/132 |

OTHER PUBLICATIONS

U.S. Appl. No. 12/253,613, filed Oct. 17, 2008, Nichols et al.
U.S. Appl. No. 12/253,709, filed Oct. 17, 2008, Nichols.
U.S. Appl. No. 12/253,696, filed Oct. 17, 2008, Nichols.
U.S. Appl. No. 12/253,698, filed Oct. 17, 2008, Kidder et al.

* cited by examiner

*Primary Examiner* — David C. Payne
*Assistant Examiner* — Tanmay Shah
(74) *Attorney, Agent, or Firm* — Seager Tufte & Wickhem LLC

(57) ABSTRACT

Systems, apparatuses and methods for selecting an appropriate frequency hopping sequence in a system of communicating devices. A random seed value is generated at the host device at its point of deployment. A frequency hopping sequence is generated using the random seed value. Other embodiments involve verifying whether the randomly generated seed value is indeed random in the operational vicinity.

23 Claims, 8 Drawing Sheets

SYSTEM, METHOD AND APPARATUS FOR SELECTING FREQUENCY HOPPING SEQUENCES

FIELD OF THE INVENTION

This invention relates in general to communications, and more particularly to systems, apparatuses and methods for facilitating real-time selection of a unique frequency hopping sequence within a vicinity of a wireless communication system.

BACKGROUND OF THE INVENTION

Systems employing numerous devices often require or otherwise benefit from the ability for these devices to communicate with one another. While each device may have its own purpose and responsibilities, they may need to transmit information to, and/or receive information from, other devices of the system. Device-to-device communication may be accomplished by wiring the devices together, and communicating via the wires. In more recent times more and more systems are employing wireless communication, which generally makes installation more convenient, and among other things provides greater flexibility and scalability.

A drawback to wireless communication is that information transfer is not confined to a wire, as in a direct wired system. Rather, the information is transmitted over the air, and transmissions from neighboring systems can interfere with system communications. To address this issue, wireless network systems have employed various methods of transmitting radio signals, such as frequency hopping. Frequency hopping generally refers to a modulation technique where the signal carrier is rapidly switched among many frequency channels. Each party to the communication must know the frequency hopping sequence in order to know when it is to transmit at a certain frequency in the sequence. Using the frequency hopping sequence, transmitting devices can properly address targeted devices, and receiving devices can reject information from neighboring devices that are not within their system but within their reception range.

The selection of the ordered list of hopping frequencies, referred to herein as a frequency hopping sequence or frequency hop set, should be selected to minimize interference to and from neighboring systems sharing the same frequency space. However, because a device may be deployed anywhere, it can be problematic to generate a hop set that is unique at the deployed location.

Customarily, a frequency hopping sequence may be based on a value that is programmed into a device at the factory, or entered by an installation technician when the system is being deployed. In either case, to remove the risk of neighboring systems using the frequency hopping sequence, there must be a large enough set of frequency hop sets to accommodate every like system currently or later in existence. This may require additional resources, such as increased local storage, lengthier messages, more complex frequency hopping sequence calculations, etc. Further, multiple devices may share a common frequency hopping sequence so that each communicating device can determine at what time and what frequency other devices are listening for transmitted messages. Each device must be privy to that common frequency hopping sequence. Establishing manners for each of the devices to create the same frequency hopping sequence can be difficult. These difficulties are exacerbated when new or additional devices need to enter the system.

Accordingly, there is a need in the communications industry for a manner of selecting an appropriate frequency hopping sequence for devices regardless of where they may be deployed. The present invention fulfills these and other needs, and offers other advantages over the prior art.

SUMMARY OF THE INVENTION

To overcome limitations in the prior art described above, and to overcome other limitations that will become apparent upon reading and understanding the present specification, the present invention discloses systems, apparatuses and methods for selecting an appropriate frequency hopping sequence(s) in a system including at least some wirelessly communicating devices.

In accordance with one embodiment, a method involves entering a mode by a host device at its point of operative deployment. While in this mode, a random seed value is generated at the host device. A frequency hopping sequence is generated using the random seed value.

According to another embodiment, the method further involves wirelessly transmitting a hail message in the wireless transmission range of the host device to query for other devices utilizing the same random seed value. A more particular embodiment further involves receiving a response(s) to the hail message, and in response generating a new random seed value for use in generating the frequency hopping sequence. In yet another embodiment, the method further involves repeatedly transmitting the hail message and generating a new random seed value until there are no responses to the hail message. In an alternative embodiment, the method involves receiving no responses to the hail message, and retaining the generated random seed value.

According to another embodiment, the method further involves transmitting the random seed value to another device (s) in the host device's intended group of communicating devices for use by the device(s) in generating the same frequency hopping sequence.

In another embodiment of the method, entering a sequence generation mode involves entering the sequence generation mode in response to receiving an input at the host device. In an alternative embodiment, entering a sequence generation mode involves entering an enrollment mode during which one or more client devices can enroll for communication with the host device.

According to another embodiment, the method further involves re-entering the enrollment mode after the random seed value has been generated, determining that the random seed value was previously generated at the host device, and bypassing generation of a new random seed value and frequency hopping sequence.

According to another embodiment, the method further involves additionally using the random seed value as a group identifier to identify a group of communication devices in which the host device is associated.

In accordance with another embodiment of the invention, a method is provided that includes generating a first random seed value from which a corresponding frequency hopping sequence may be derived. The method further involves hailing devices within a wireless communication range based on the first random seed value, and monitoring for any response to the hailing from the hailed devices. A second random seed value is generated to replace the first random seed value if any response to the hailing is received from the hailed devices.

According to another embodiment, the method further involves using the first random seed value to generate a corresponding frequency hopping sequence if no response to the hailing is received from the hailed devices. Another embodiment further involves transmitting the first random seed value to one or more devices. In a still another embodiment the method further involves generating a frequency hopping sequence at the one or more devices based on the transmitted first random seed value.

According to still another embodiment, the method further involves using the second random seed value to generate a corresponding frequency hopping sequence.

In another embodiment of the method, generating a first random seed value involves generating the first random seed value in response to entering an enrollment mode during which one or more client devices can enroll for communication with the host device.

In another embodiment of the method, monitoring for any response to the hailing involves monitoring for any response to the hailing during an established time duration, and generating the second random seed value if any response is received involves generating the second random seed value if any response is received before expiration of the established time duration.

According to yet another embodiment, the method further involves hailing the devices within the wireless communication range based on the second random seed value, monitoring for any response to the hailing from the hailed devices in response to hailing the devices based on the second random seed value, and generating a third random seed value to replace the second random seed value if any response to the hailing is received from the hailed devices. A more particular embodiment further involves using the second random seed value to generate a corresponding hop set if no response message was received from the one or more neighboring systems based on the second random seed value.

In accordance with another embodiment of the invention, an apparatus is provided to facilitate generation of a seed value for use in creating a frequency hopping sequence. The apparatus includes a random seed generation module configured to generate a random seed value at a time of its deployment. A sequence calculation module is configured to generate a frequency hopping sequence that is dependent on the generated random seed value. A transmitter is configured to transmit the generated random seed value to devices enrolling for communication with the apparatus.

In another embodiment, the apparatus further includes a mode activation module configured to enter an enrollment mode, where the random seed generation module is coupled to the mode activation module and configured to initiate the generation of the random seed value at the random seed generation module in response to operating in the enrollment mode.

In accordance with another embodiment of the invention, a system of communicating devices is provided. The system includes a host device and at least one neighboring device. The neighboring device can be a device that is in the system, but in a different group as the host device, or a device entirely outside of the intended system. The neighboring device(s) includes a receiver configured to wirelessly receive hail messages communications, and transmitter, and a processor configured to cause the transmitter to wirelessly transmit responses to any received hail message. The host device includes a random seed generation module configured to generate a random seed value at a time of deployment of the host device, a message generation module configured to create a hail message based on the generated random seed value, a transmitter to wirelessly transmit the hail message, a receiver to wirelessly receive any responses to the hail message, and a response recognition module configured to determine whether any responses to the hail message were received, and to direct the random seed generation module to generate a replacement random seed value if any responses to the hail message were received.

In another embodiment, the system further includes one or more client devices. The transmitter in the host device is configured to wirelessly transmit the random seed or the replacement random seed to the client devices, depending on whether any responses were received to the hail message. In another embodiment, each of the client devices includes a sequence generation module configured to create a like frequency hopping sequence based on the received random seed or replacement random seed.

The above summary of the invention is not intended to describe every embodiment or implementation of the present invention. Rather, attention is directed to the following figures and description which sets forth representative embodiments of the invention.

BRIEF DESCRIPTION OF THE DRAWINGS

The invention is described in connection with the embodiments illustrated in the following diagrams.

DETAILED DESCRIPTION

Figure 1:
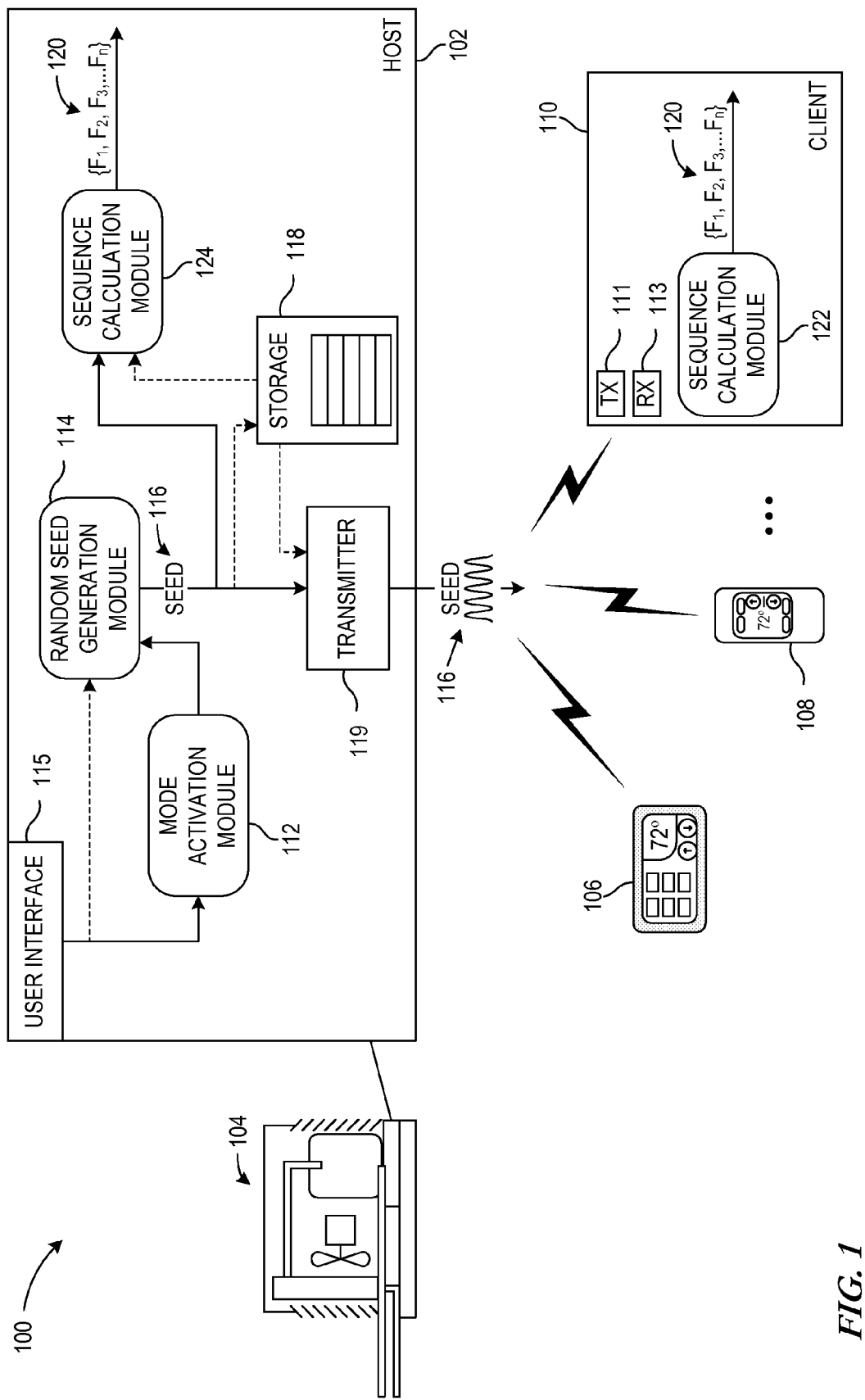
FIG. 1 is a block diagram depicting a representative device capable of generating a random seed value at its point of operative deployment in a system.

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides systems, apparatuses and methods for facilitating real-time selection of a unique frequency hopping sequence within a vicinity of a wireless communication system.

Customarily, a frequency hopping sequence may be based on a value that is programmed into a device at the factory, or entered by an installation technician when the system is being deployed. In either case, to remove the risk of neighboring systems using the same seed value and frequency hopping sequence, there must be a large enough set of potential seed values to accommodate every like system currently or latterly in existence. This may require additional resources, such as increased local storage, lengthier messages, more complex frequency hopping sequence calculations, etc. Further, multiple devices may share a common frequency hopping sequence so that each communicating device can determine at what time and what frequency other devices are listening for transmitted messages. Each device must be privy to that common frequency hopping sequence. Establishing seed values in advance for each of the devices to create the same frequency hopping sequence is difficult from an organizational standpoint. These difficulties are exacerbated when new or additional devices need to enter the system.

The present invention facilitates selection of a frequency hopping sequence (also referred to herein as a "frequency hop set"). In one embodiment, a special mode is initiated, such as a sequence generation mode, which may or may not be integrated with other modes such as a device enrollment mode. As used herein, the sequence generation mode generally refers to any mode that the seed-generating device is placed in, in order to carry out random seed generation functions in accordance with the invention. The mode is entered by the seed-generating device (referred to herein as a "host" device) at its point of operative deployment. The host device generates a random seed value that can be used by the host and/or other devices to derive a frequency hopping sequence. No predetermined seed value is required, and installers are relieved of entering seed values at the host or any other device.

One embodiment involves the generation of the random seed value, and subsequent testing of the generated seed value for local uniqueness. When a random seed has been generated, the host hails or otherwise summons other possible listening devices of its own system and/or neighboring systems. For purposes of simplicity, other possible devices of the host's own system and any devices of neighboring systems are generically referred to herein as "neighboring systems" and "neighboring devices" where appropriate. The seed-generating host monitors for any responses from those neighboring devices and systems. If no response is received to the hail message(s), it is assumed that none of these neighboring devices/systems are using the randomly-generated seed to formulate their frequency hopping sequence, and the generated seed value is used as the seed for generating the frequency hopping sequence for the system at issue. If a response(s) is received, then another device(s) from a neighboring system(s) is already using that seed value. In this case, another random seed value is generated, and another hail message is sent. This continues until no neighboring devices respond, thereby indicating that the seed value is truly unique within its area, and the new generated seed value is used as the seed for generating the frequency hopping sequence for the system at issue.

It should be recognized that a "unique" seed as used herein generally refers to uniqueness within the vicinity of the network of devices of the intended communication system. For example, the vicinity of the network may correlate to the wireless transmission range of the communicating devices in the system. Thus global uniqueness of the seed value is not necessarily required, as the communication range of the system is inherently limiting. Thus, as used herein, a unique randomly-generated seed suggests uniqueness relative to other neighboring systems that may be within or otherwise proximate the communication range of the system at issue.

FIG. 1 is a block diagram depicting a representative device 102 capable of generating a random seed value at its point of operative deployment in a system 100 of devices. The system 100 is depicted as a heating, ventilation and air conditioning (HVAC) system for purposes of illustration only. As will be readily apparent to those skilled in the art from the teachings provided herein, the invention is equally applicable to other analogous systems employing wirelessly communicating devices. Other representative examples include security systems, area control systems, etc. Additionally, in the illustrated embodiment, the seed-generating device 100 is referred to as a "host." However, this does not require or imply a server-client relationship in the networking sense, although this may be the case. The invention is equally applicable to any logical relationship between communicating devices (e.g. peer-to-peer, server-client, client-queue-client, etc.). Additionally, in the illustrated embodiment, the seed-generating device 100 is referred to as a "host." However, this is not require or imply a server-client relationship in the networking sense, although this may be the case. The invention is equally applicable to any logical relationship between communicating devices (e.g. peer-to-peer, server-client, client-queue-client, etc.).

The representative HVAC system 100 includes other devices that may or may not wirelessly communicate with the host 102. For example, some units such as the HVAC unit 104 may be wired to the host 102. Other devices 106, 108, 110, generally referred to herein as "clients," may communicate via wire, or wirelessly as depicted in FIG. 1. In an exemplary embodiment, the host 102 and clients 106, 108, 110 communicate via a plurality of carrier frequencies. The illustrated devices 100, 106-110 communicate messages via successive frequencies in a multi-frequency sequence of available frequencies, such as in the case of frequency hopping. While each message may be sent using multiple frequencies of the frequency hopping sequence, one embodiment involves sending each message in its entirety at one frequency, and moving to the next frequency of the sequence for the next message transmission. Devices listen for messages from other devices of the system 100 in a similar manner. These devices may repeatedly, periodically or sporadically send messages or other information to one or more receiving devices.

In one embodiment the device 102 is placed in a certain mode which initiates the seed generation functions. For example, the mode activation module 112 can trigger the random seed generation module 114. For manual activations, an installer or other user can cause the device 102 to enter the seed generation mode via a user interface (UI) 115. This could also be initiated using a signal originating remotely from the device 102. The mode activation module can also be triggered upon power up, such that, for example, the mode activation module 112 is integrally implemented during a power up routine to provide the seed(s) if it has not previously been generated. Thus, the mode activation module 112 generally represents the process of entering a mode where a random seed can be generated or otherwise triggering the generation of a random seed value by the random seed generation module 114.

In the illustrated embodiment, the random seed generation module 114 generates the random seed value 116. In one embodiment, the generated seed is a 16-bit seed, and thus a random two-byte value is generated. The random seed generation module 114 can be implemented, for example, as a stand-alone random number generator (RNG), or via a processor where program instructions are executed to perform a random number generation function. The seed 116 may be temporarily or permanently stored, such as in the storage 118. The storage 118 represents any type of storage for digital data, such as read-only memory, random access memory, magnetic media, removable storage (e.g. FLASH memory), optical media, etc. In the description of FIG. 1, it is assumed that the storage 118 is non-volatile memory that preserves the seed 116 in storage 118 in the event of device 102 power down. As described more fully below, a frequency hopping sequence is derived from the randomly-generated seed, at the host 102 and/or clients 106, 108, 110.

The device 102 thus generates the random seed 116 at its operative deployment location, where the transmitter 119 can transmit the seed 116 to any devices 106, 108, 110 that are enrolling or otherwise configured to receive the seed 116. In the illustrated embodiment a client 110 includes a receiver (RX) 113 to receive the seed 116, and calculates the frequency hopping sequence 120 based on the seed 116 using a sequence calculation module 122. Module 122 can be implemented using, for example, discrete components, a processor (s) executing software/firmware, etc. For purposes of FIG. 1 it is assumed that a processor is configured by a sequence calculation algorithm that uses the randomly-generated seed 116 to perform the calculation of the frequency hopping sequence 120. In an exemplary embodiment, the same seed value always produces the same hopping sequence 120, and different seed values produce different hopping sequences. In this manner, the same frequency hopping sequence 120 will be generated each time the sequence calculation module 122 and/or other similar sequence calculation modules use the same seed 116 as its input.

The generated sequence 120 may be a sequence used by multiple devices in the system 100. For example, the generated sequence 120 may be the frequency hopping sequence at which each of the devices monitor for incoming messages. In such a case, each device that intends to receive messages using this frequency hopping sequence 120 must be privy to that frequency hopping sequence 120. Further, devices sending messages may need to be privy to the frequency hopping sequence 120 to know when they can send a message that will be heard by other devices. For these representative and other reasons, multiple devices may need to calculate the frequency hopping sequence 120 based on the same seed 116. This is the case in the illustrated embodiment, where it is assumed that each of the clients 106, 108, 110 will receive the seed 116 and generate the frequency hopping sequence 120. Similarly, the host 102 will also generate the frequency hopping sequence 120 using the seed 116 by way of its own sequence calculation module 124. Clients and other neighboring devices also include a transmitter 111, which can be used to respond to hailing messages as is described in further embodiments below.

In one embodiment, the generated seed 116 is provided to each of the clients 106, 108, 110 rather than generating and transmitting the entire frequency hopping sequence 120 to every other communicating device in the system 100. Each device can calculate the same frequency hopping sequence 120 using the seed 116. In one embodiment, any one or more of the devices 102, 106, 108, 110 can generate the frequency hopping sequence 120 once and store it. Alternatively, any device can store the seed value 116 and generate the frequency hopping sequence 120 each time it is needed, as described in co-pending U.S. patent application Ser. No. 12/253,709, filed on Oct. 17, 2008, and entitled "System, Apparatus And Method For Identifying Transmission Frequencies For Communicating Data," the content of which is incorporated herein by reference in its entirety.

Any desired calculation of the frequency hopping sequence(s) that utilizes a seed(s) may be used in accordance with the invention. For example, assume there are fifty frequencies to be used in a hopping sequence. In one example of a frequency hopping sequence calculation, the fifty frequency identifiers (e.g., $F_0$, $F_1$, $F_2$, etc.) are arranged into two rows in sequential order (i.e. top row $F_0$-$F_{24}$ and bottom row $F_{25}$-$F_{49}$.

This creates 25 frequency "pairs" with each pair spanning 25 frequency IDs (e.g., pairs $F_0/F_{25}$, $F_1/F_{26}$, etc.). The exemplary algorithm then involves dividing the set into three groups: 0-24; 25-37; 38-49. One group, such as group 25-37, is then shuffled based on the seed. Shuffling in this sense means moving the frequency IDs to different sequence locations, and any shuffling arrangement can be used. Another group (e.g., group 38-49) is then shuffled in a like, or different manner. Because of the two rows of frequency IDs, shuffling these two groups results in a list of pairs consisting of a member of group 0-12 with a member of group 25-37, and a list of pairs consisting of a member of group 13-24 with a member of group 38-49. Then, the pairs can be shuffled based on the seed, the order of random pairs is reversed based on the seed, and the sequence becomes each column from left to right. Again it should be recognized that any frequency calculation algorithm may be used, and the above is provided merely to facilitate an understanding of what sequence generation based on a seed may involve.

Thus, in accordance with the embodiment of FIG. 1, a state or mode can be entered by a device at its point of operative deployment; e.g. within its wireless transmission range of devices to which it will communicate during normal operation. In response, a random seed value is generated in real-time, which can be used to by one, more or all of the devices in the system to calculate a collectively-used frequency hopping sequence. Using the calculated frequency hopping sequence, the devices can communicate with one another via frequency hopping techniques. In other embodiments, the host 102 can randomly calculate and transmit multiple random seed values which would result in a corresponding number of frequency hopping sequences. This may be beneficial in situations where the host 102 is charged with generating other frequency hopping sequences that may be used by other devices 106, 108, 110, such as device-specific transmission frequency hopping sequences.

Figure 2A:
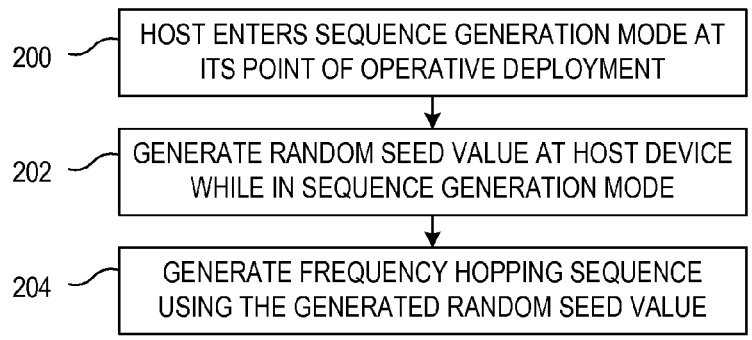
FIGS. 2A and 2B are flow diagrams of representative methods for facilitating real-time selection of a unique frequency hopping sequence accordance with the present invention.

FIG. 2A is a flow diagram of a representative method for facilitating real-time selection of a unique frequency hopping sequence accordance with the present invention. A device enters a mode 200, such as a sequence generation mode, at its point of operative deployment. A random seed value is generated 202 at the device while in this mode. It should be recognized that the degree of "randomness" of the seed value is not of particular importance, but rather that it is not a predetermined seed value. For example, different random number generation algorithms may produce results that statistically have different degrees of randomness, yet any such random number generation technique is applicable. Using this generated seed, a frequency hopping sequence is then generated 204 at the point of system deployment.

Figure 2B:
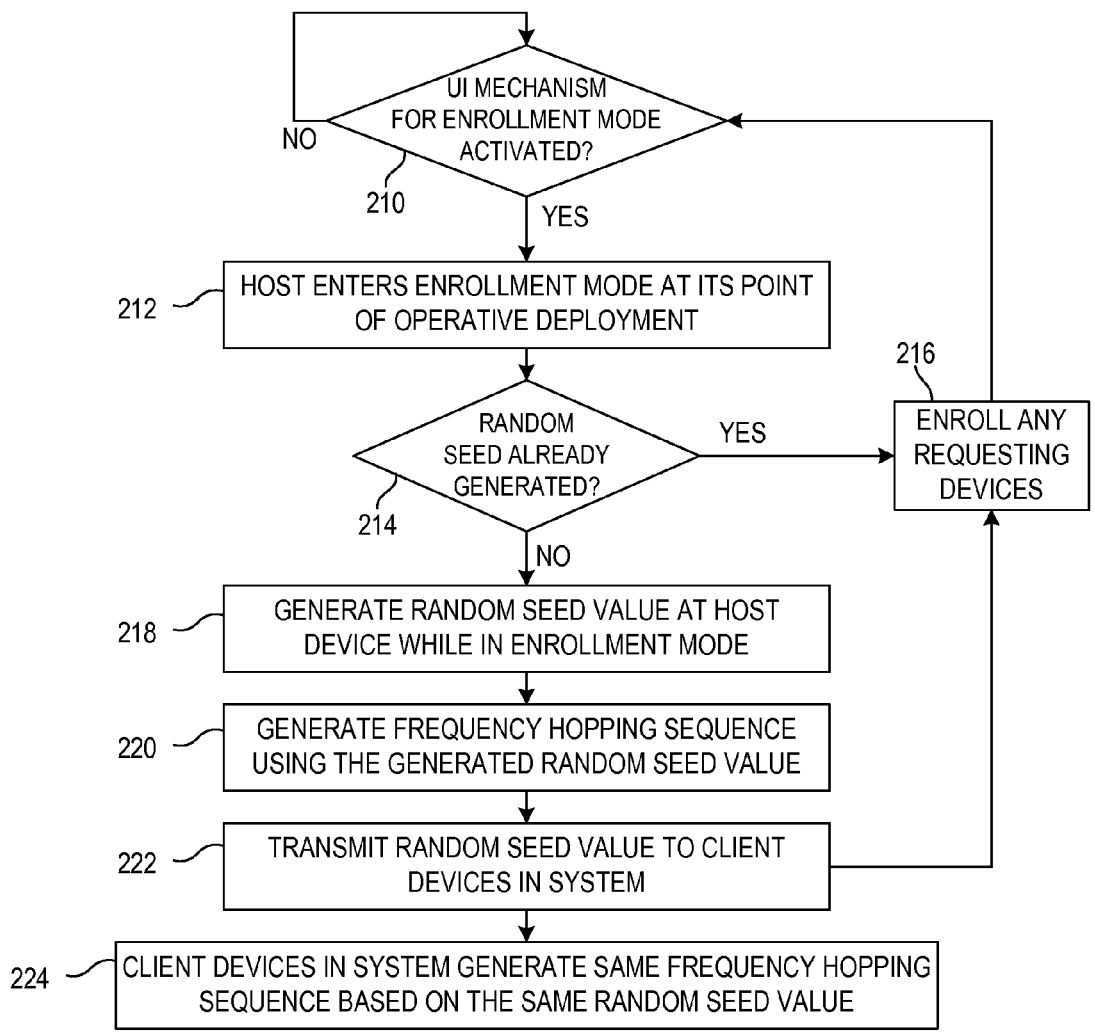

FIG. 2B is a flow diagram of another representative method for facilitating real-time selection of a unique frequency hopping sequence accordance with the present invention. It is determined 210 whether a user interface (UI) mechanism has been activated to enter an enrollment mode. In the illustrated embodiment, the random seed generation is performed during enrollment of devices to the host, whereby those enrolling devices are made known to the host, and vice-versa. For example, devices that are known to be in the same system may be allowed to communicate with one another, relative to other devices that have not (or are not suppose to) enroll with the host. When the mechanism has been activated 210, the host enters 212 the enrollment mode.

In one embodiment, it is determined 214 whether the random seed has already been generated by the host. This is because other devices may seek to enroll with the host after an initial or "out of the box" condition where the host generated the random seed value for devices to generate the common frequency hopping sequence. If the random seed value had already been generated, it need not be generated again, and therefore the seed generation functions are bypassed. Any devices requesting enrollment are then enrolled 216.

Alternatively, the random seed may not yet be generated. For example, in the illustrated embodiment, the first time that the host has to enter an enrollment mode is when the random seed value is generated. If it is determined 214 that the random seed has not yet been generated, the random seed is generated 218 at the host. In some embodiments, the host may itself generate 220 its frequency hopping sequence using the generated random seed value. The generated seed can be transmitted 222 to one or more client devices in the system, where they in turn generate 224 the same frequency hopping sequence based on the same generated random seed value.

Figure 3:
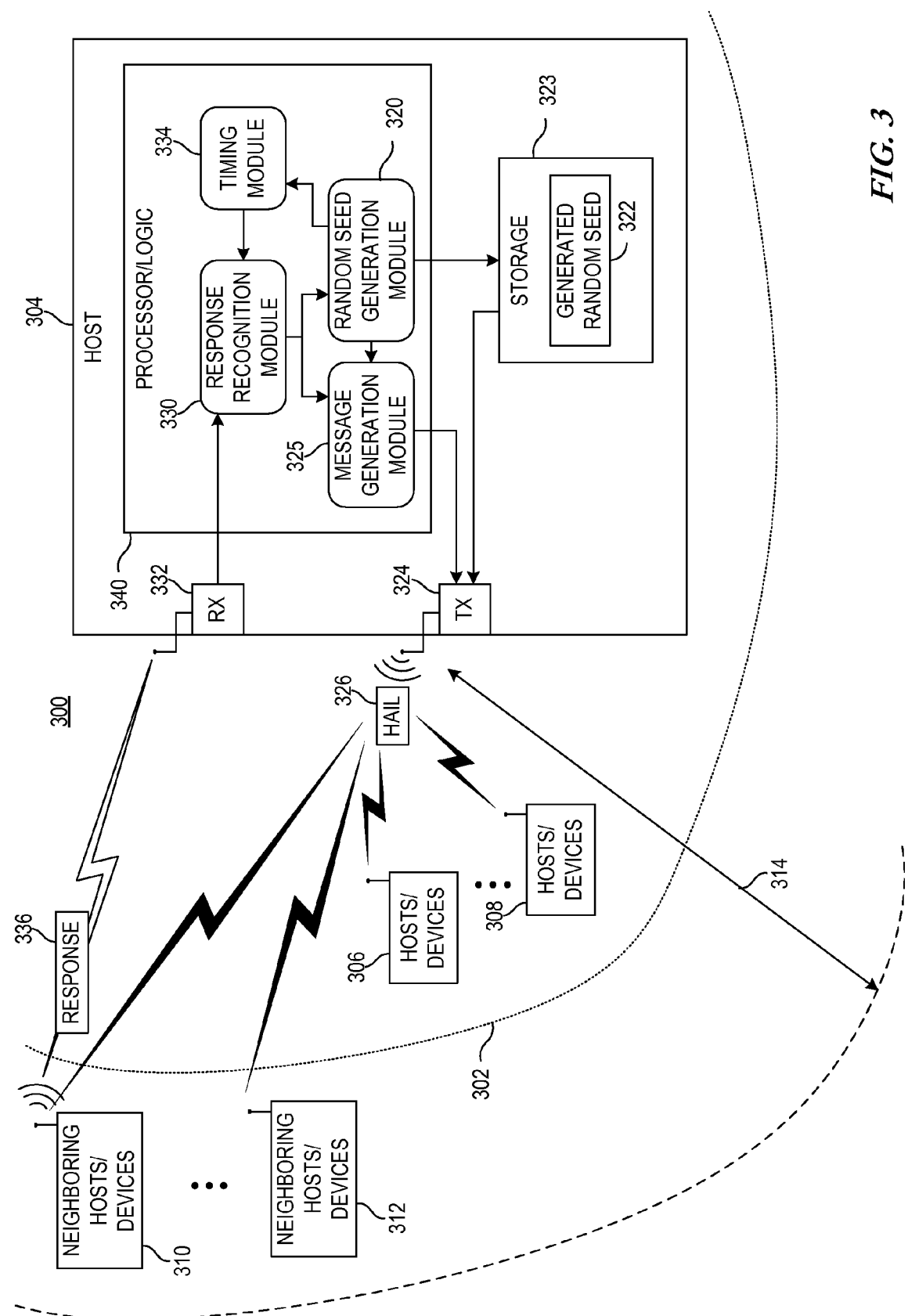
FIG. 3 is a block diagram depicting a representative device capable of generating a random seed value at its point of operative deployment in a system, and verifying that the seed value is not already being used in the communicating vicinity.

FIG. 3 is a block diagram depicting a representative device capable of generating a random seed value at its point of operative deployment in a system 300, and verifying that the seed value is not already being used in the communicating vicinity. The system 300 of FIG. 3 refers to the various devices intended to be configured to communicate with one another, and is delineated by the system delineator 302. Any device, represented by host 304, can serve as the entity to generate the random seed value. One or more other devices, represented as hosts or other devices 306, 308 can be part of the system 300. As will be described more fully below, one or more other neighboring hosts/devices 310, 312 may be within the wireless transmission range 314 of the system 300, but outside the intended group of devices 304, 306, 308 forming the desired system 300.

A random seed generation module 320 generates the random seed 322 in a manner as previously described. The seed may be stored in the storage 323. In the illustrated embodiment, a message or other notification signal is created for transmission via transmitter (TX) 324. A message generation module 325 may create the message for transmission. This message, referred to as the hailing or hail message 326, is broadcast from the host 304. The message 326 will naturally be transmitted to the outer boundaries of the TX's 324 transmission range 314.

In one embodiment, transmission of the hail message 326 is performed using the generated random seed number as a group identifier, that other devices of a group would recognize. For example, devices forming a "group" within a system (which may include a subset or the whole set of devices in the system), may use a group ID or "house code" to distinguish its group from other groups of the system and/or neighboring systems. In one embodiment, the randomly generated seed value is also used as the group ID for the devices of the system 300. If the host 304 broadcast a hail message 326 to one or more other devices using the random seed as its group ID, then other devices that would have that group ID assigned for their group would recognize the hail message, and would respond to the host 304. In one embodiment, only other devices capable of also generating random seed values and/or assigning group IDs are capable (e.g. designed for) receiving and responding to such a hail messages 326. Such other devices include a processor and associated circuitry (see FIG. 7) configured to formulate and transmit a proper response to a hail message.

In another embodiment, the hail message 326 can include the generated random seed value as data to a system-independent broadcast message, which can be compared to the seed value that may be used by neighboring systems. In such an embodiment, the group ID would likely not be the same as the seed value, and the hail message 326 serves as a request for neighboring systems to compare the transmitted seed value in the hail message 326 to their respective seed values.

The response recognition module 330 is coupled to the receiver (RX) 332 which receives any responses to the hail message 326. In one embodiment, a timing module 334 is configured to establish a time duration during which the response recognition module 330 will monitor for responses to the hail message 326. If no responses are received within the time duration, the original generated random seed 322 will be retained and used as the seed for deriving the frequency hopping sequence for the system 300. In one embodiment, message generation module 325 creates the message for transmission in response to the response recognition module 330 recognizing that a seed 322 has been established and is ready for transmission to one or more other devices that will use the seed 322 to create the same frequency hopping sequence.

On the other hand, one or more devices in the system from other "groups" may recognize the hail message 326, thereby indicating that the group ID, and therefore the generated seed value 322, is already in use in the relevant vicinity. Further, one or more devices 310, 312 from neighboring systems may be within the communication range 314 of the system 300, and could also respond to the hail message 326. This too would indicate that the generated seed value is not unique in the relevant vicinity. In the illustrated example, it is assumed that a neighboring host 310 recognized the hail message 326, and issued a response message 336 which is received at the host's 304 receiver 332 with the time period established by the timing module 334. In this case the response recognition module 330 recognizes the response to the hail message, such as by parsing the message and determining from header fields and/or data that it is a hail message response 336. Because the seed value is not unique in the vicinity, the response recognition module 330 instructs the random seed generation module 320 to generate a new random seed. Using the new seed, another hail message 326 is transmitted, and the process continues until the response recognition module 330 does not receive any response 336 to the hail message 326. The seed value, that was associated with the hail message 326 that did not result in a response, is then used as the seed value by the system 300 to generate the frequency hopping sequence. The random seed generation module 320, response recognition module 330, message generation module 325 and timing module 334 can be implemented using, for example, logic circuits and/or a processor as depicted by block 340.

Figure 4A:
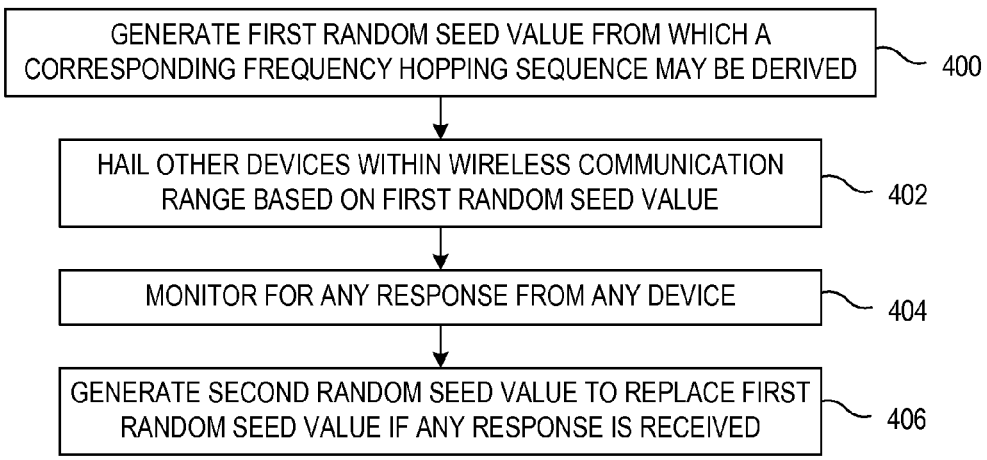
FIGS. 4A, 4B and 4C are flow diagrams illustrating representative methods for generating a random seed value and verifying its uniqueness in the communicating vicinity.

FIG. 4A is a flow diagram illustrating a representative method for generating a random seed value and verifying its uniqueness in the communicating vicinity. A first random seed value is generated 400 from which a corresponding frequency hopping sequence may ultimately be derived. The method involves hailing or otherwise summoning 402 other devices within a wireless transmission range based on the first random seed value. The hailing device monitors 404 for any response to the hail message from any device(s). If any response is received, a second random seed value is generated 406 to replace the first random seed value.

Figure 4B:
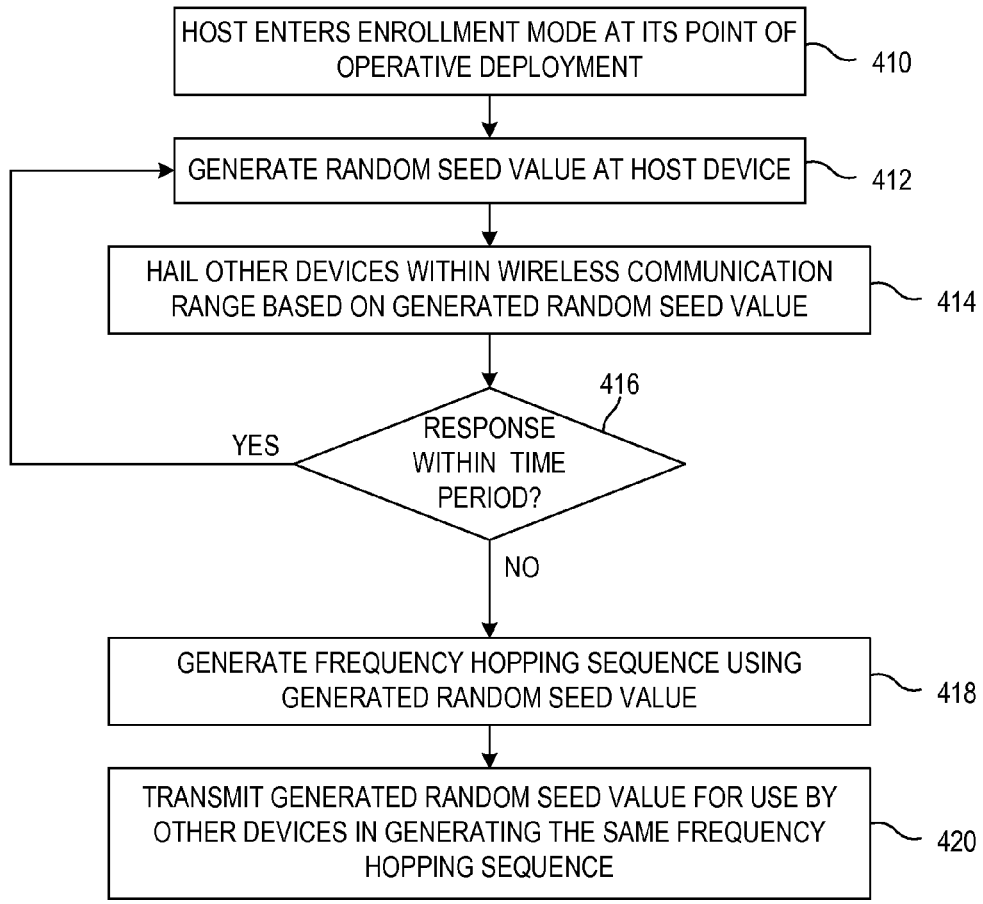

FIG. 4B is a flow diagram illustrating another representative method for generating a random seed value and verifying its uniqueness in the communicating vicinity. In the embodiment of FIG. 4B, a host enters 410 an enrollment mode at its point of operative deployment. A random seed value is generated 412 at the host device. The host hails 414 other devices within the wireless communication range of the host, based on the generated random seed value. In one embodiment, the host performs this hailing 414 function by creating and transmitting a hail message. For example, the neighboring systems may be of the same design as the host that is issuing the hail message, and can therefore recognize the format of a hailing message. Example 1 below depicts a relevant portion of a hail message:

EXAMPLE 1

| FIELD | MESSAGE VALUE |
|---|---|
| ... | ... |
| ... | ... |
| Message Class | Ping |
| Service | Query |

In Example 1, the message includes a field for a message class. The message value for this field is depicted as "ping," which has a value representative of the hail message. The service field is depicted as "query," which indicates that the transmitting host is looking for a response to the query. Referring back to FIG. 3, the response recognition module 330 is a representative module that can monitor for such a response to the query. Example 1 is provided merely to facilitate an understanding of one manner in which a hail message may be structured, but any manner of hailing may be implemented.

In one embodiment, the generated seed is used also to be used as a group ID. Other systems of the same design similarly use the generated seed as their group ID. Thus, the hailing host can send the hailing message as a "ping" message to check to see if any device can respond at all to its broadcast message using the seed value as the group ID. If the device responds (e.g. answers the ping), it is known that other systems already use that group ID, and consequently already use the generated random seed value.

It is then determined 416 whether a response was received within a time period. For example, the timing module 334 of FIG. 3 can establish the time period. As indicated above, response recognition module 330 can determine whether a response is received within that time period. In one embodiment, a device receiving the hail message may be of the same design as the host that is issuing the hail message. Such a receiving device can thus recognize the format of a hailing message, and can structure a response message that will be recognized by the hailing host. Example 2 below depicts a relevant portion of a hail response message:

EXAMPLE 2

| FIELD | MESSAGE VALUE |
|---|---|
| ... | ... |
| ... | ... |
| Message Class | Ping |
| Service | Report |

In Example 2, the message again includes a field for a message class. The message value for this field is depicted as "ping," which has a value representative of the hail message type. The service field is depicted as "report," which when the group ID corresponds to the random seed value, indicates that the responding device is reporting back to the hailing host that the random seed is already in use.

Other messages may be provided where the group ID and seed number are not the same in a group. For example, the hail message may simply broadcast a message that can be perceived by neighboring systems that are configured to respond to broadcast messages. The hail message can include the generated random seed, which can be compared to the seed value at the receiving device(s). The receiving device(s) can then transmit a message back to the hailing device to notify it as to whether that random seed is already in use in generating frequency hopping sequences.

If a response is received within the time period, a new random seed value is generated 412 at the host, and the hailing function 414 is again performed. This continues until there is no response. In one embodiment the host then uses that generated seed value to generate 418 a frequency hopping sequence. The settled upon random seed value may also be transmitted 420 to other devices in the system (e.g. enrolling devices) for use by those devices in generating the same frequency hopping sequence.

Figure 4C:
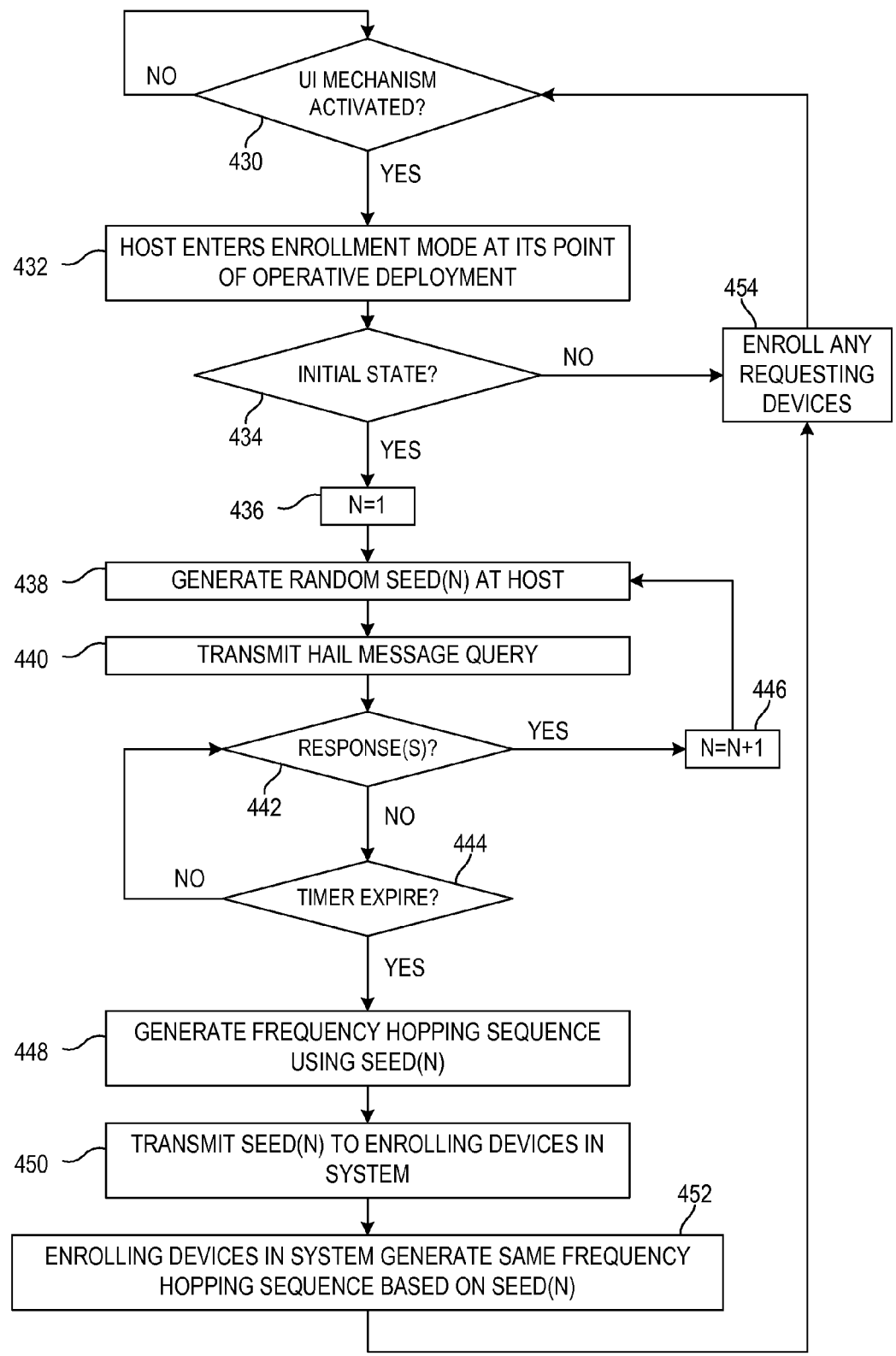

FIG. 4C is a flow diagram illustrating yet another representative method for generating a random seed value and verifying its uniqueness in the communicating vicinity. It is determined 430 whether a UI mechanism is activated, and if so, the host enters 432 an enrollment mode at its point of operative deployment. It is determined 434 whether the host is in an initial state. For example, the device may be in an "out of the box" state where the host has not yet entered an enrollment mode, or at least has not yet had to generate the random seed value for use in generating a frequency hopping sequence. If the host is beyond this initial state, it can enroll 454 any devices that prompted the host's entry into the enrollment mode.

If the host is in an initial state, the process then begins one or more iterations of generating a random seed and hailing other systems to obtain a locally unique seed value. This is depicted in the flow diagram by a value, such as N=1 shown at block 436. A first random seed value, RANDOM SEED(1), is generated 438. A hail message is transmitted 440 as previously described. If it is determined 442 that a response was received before a timer expires 444, then the seed value is not locally unique. In this case, N is incremented 446, and a random seed value RANDOM SEED(2) is generated 438. This continues until there is no response 442 and the timer has expired 444. At this time, the seed value has been established, and can be used to generate 448 a frequency hopping sequence using RANDOM SEED(N) and/or transmitting 450 the RANDOM SEED(N) to devices currently or subsequently enrolling in the system. The enrolling devices that receive the seed can then generate 452 the same frequency hopping sequence based on RANDOM SEED(N). If the process is involved with an enrollment or binding process, those enrolling devices can further be enrolled 454.

As indicated above, the random seed value that is generated at the point of deployment is used to generate a frequency hopping sequence. Where the seed value is transmitted to other devices, those devices will include an algorithm to generate the same frequency hopping sequence based on the same seed value. Thus, multiple devices will share a common frequency hopping sequence. There are various purposes for having multiple devices share such a frequency hopping sequence.

Particularly, multiple devices may transmit and receive using the same frequency hopping sequence. For example, if each device tracks the active frequency of the frequency hopping sequence, it knows at what frequency it can receive and transmit information at any given time. Conflict detection may be required where any device can transmit during the active frequency.

Below is another example, in which a shared frequency hopping sequence may be used by devices when they are monitoring for transmitted messages. Generally, messages or other information can be transmitted at any of a plurality of available transmission frequencies. Frequency hopping is used to the extent that transmissions of information and receptions of communicated information take place according to the aforementioned "sequences" of communication frequencies. For example, devices may use a shared frequency hopping sequence for receiving messages that is different than device-specific frequency hopping sequences used to transmit messages. One such system and method is described in co-pending application U.S. patent application Ser. No. 12/253,613, filed on Oct. 17, 2008, and entitled "System, Apparatus And Method For Communicating Messages Using Multiple Frequency Hopping Sequences," the content of which is incorporated herein by reference in its entirety. The example below briefly describes an example of such a use of a shared frequency hopping sequence.

For this example, a transmitting device is a device that wants to transmit information at that time, although it may also be a receiving device. The transmitting device transmits information at the next available frequency of its own transmitter frequency hopping sequence, but does not transmit that information until that same frequency arises in the shared receiving frequency hopping sequence. In such an embodiment the transmitter frequency hopping sequence determines which frequency to use in transmitting the information, and the shared receiver frequency hopping sequence determines when that transmission will occur. For example, if the transmitting device is to transmit a pending message at $F_N$, it will do so when the frequency $F_N$ arises in the shared receiver's pseudo-random sequence. However, for the transmitting device to know when the receiving device(s) will be listening, it must also be privy to the receiver's frequency hopping sequence. Each device that transmits information can obtain the shared, receiver frequency hopping sequence in accordance with the present invention by obtaining the generated random seed value from the host.

The functions described in connection with the invention may be used in any device in which data is to be communicated. In one embodiment, the systems, apparatuses and methods of the invention are implemented in environmental monitoring and control systems, such as HVAC systems. Representative examples of such systems are generally described below. However, it should be recognized that the aforementioned systems, apparatuses and methods may be used in any communication device and associated system.

Environmental control systems can monitor and control numerous environmental and safety devices. These devices include, for example, thermostats, HVAC modules, equipment interfaces, sensors, remote controls, zoning panels, dampers, humidifiers and dehumidifiers, etc. It may be beneficial for some or all of these devices to communicate with each other wirelessly, which significantly eases installation and wiring complications. Wireless units also provide users with flexibility of use, and more options in positioning the devices. These and other advantages of implementing air interfaces have led to the use of the wireless transmission of some data in HVAC systems.

Figure 5:
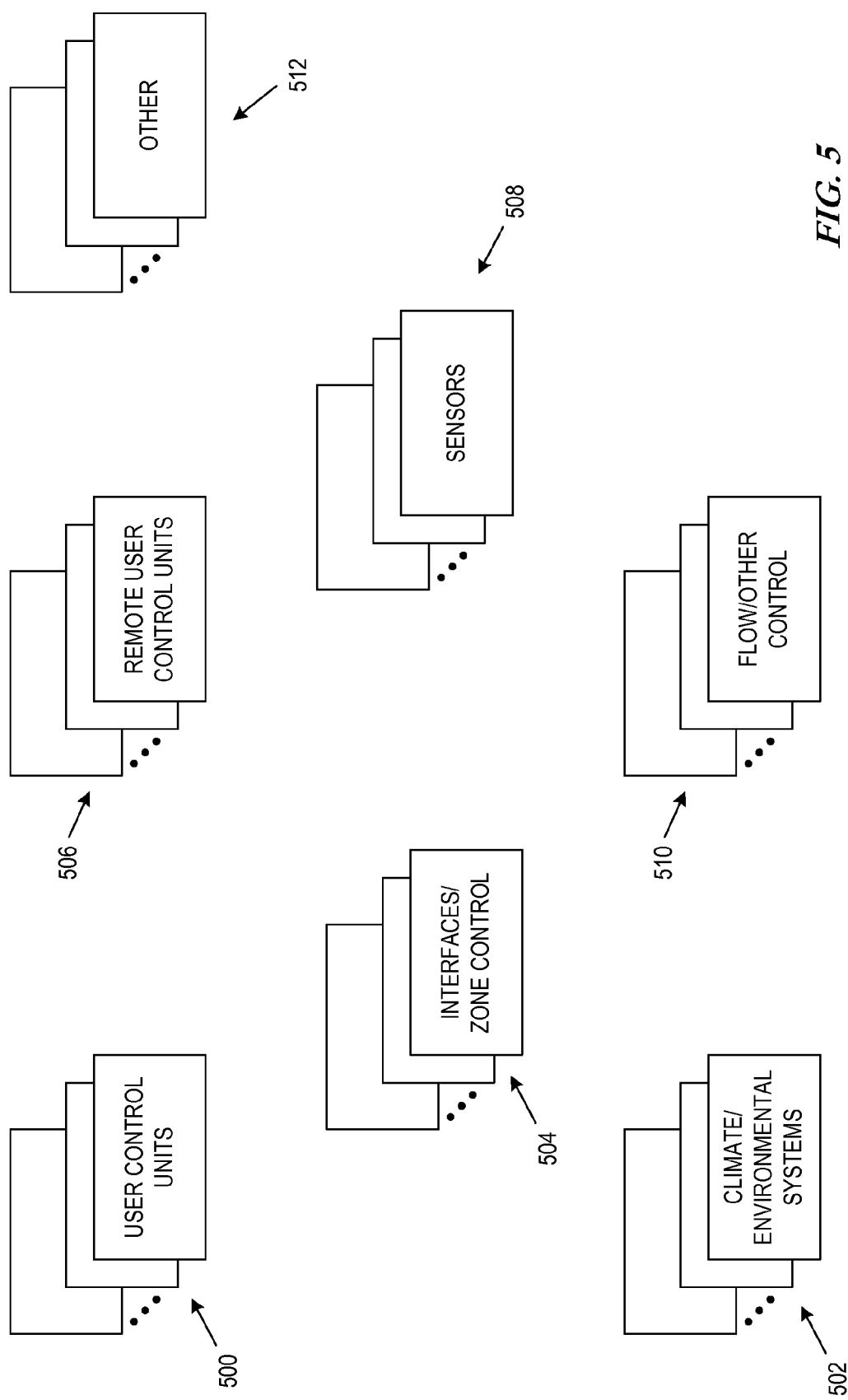
FIG. 5 is a block diagram generally illustrating representative HVAC elements and devices in which air interfaces may be used.

FIG. 5 is a block diagram generally illustrating representative HVAC elements and devices in which air interfaces may be used. FIG. 5 depicts one or more user control units 500, such as wireless thermostats where users can enter a temperature setpoint designating a desired temperature. Other examples of user control units 500 include humidity control units, lighting control units, security control units, etc. Climate or environmental systems 502 may include the equipment to cause the desired action to occur. One such system 502 is an HVAC system, which includes equipment to raise or lower temperature, humidity, etc. User control units 500 may communicate directly with such climate/environmental systems 502, and/or may communicate via one or more interfaces or zone controllers 504. Remote user control units 506 provide portable user control, such as providing a visual and/or audio interface to the user, and allowing the user to change environmental setpoints, check status, etc. Sensors 508 may be used to sense environmental conditions, and may be discrete devices (e.g. outdoor air/temperature sensor) or may be integrated into user control units 500. Flow and other control equipment 510 may also be used, such as dampers, ultraviolet air treatment lamps, etc. Any of these devices may need to communicate information amongst themselves and/or with other devices 512, in which the present invention may be utilized.

When these devices communicate wirelessly with one another via radio frequency (RF) or other wireless means, there is a reasonable chance that a wirelessly communicating device may experience interference from neighboring systems or other devices of the same system. Using frequency hopping can significantly reduce such interference, and establishing frequency hopping sequences in accordance with the present invention enhances the ability to do so.

Some devices in the system may be powered by power sources and communicate via wire and/or over the air, while other devices may be battery-powered and communicate information wirelessly. Any device may be powered in any desired manner. In one embodiment, a host or other device may be powered by an AC voltage such as 24 volts AC (VAC), and may remain powered on while operating in the system. In some embodiments, devices referred to as hosts in the prior figures and description can correspond to such powered devices, or alternatively such hosts may be powered in other manners such as by battery or other DC voltage, energy harvesting, etc. In other embodiments, prior references to hosts can refer to any device in the system. Other devices that are powered by battery (e.g., clients) may enter a sleep mode to preserve battery life. In one embodiment, a collection of devices including a host(s) and its clients may be referred to as a "group," and a collection of physical groups that communicate through their host(s) may be referred to as a "system." However, a "system" as otherwise used herein does not require any such groupings, and may involve as few as two communicating devices.

Figure 6A:
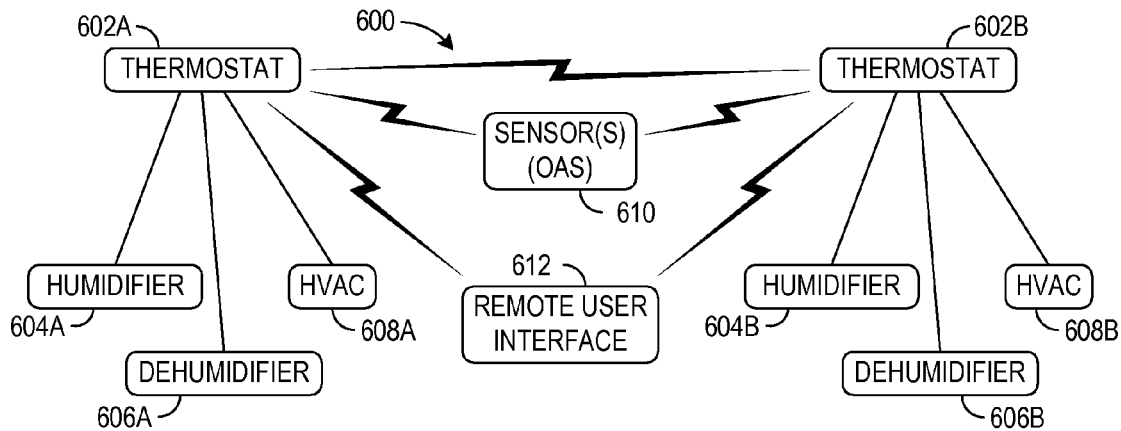
FIGS. 6A-6C depict some representative examples of clients, hosts, groups and systems that benefit from the deployment location generation of random frequency hopping sequence seeds in accordance with the present invention.
Figure 6B:
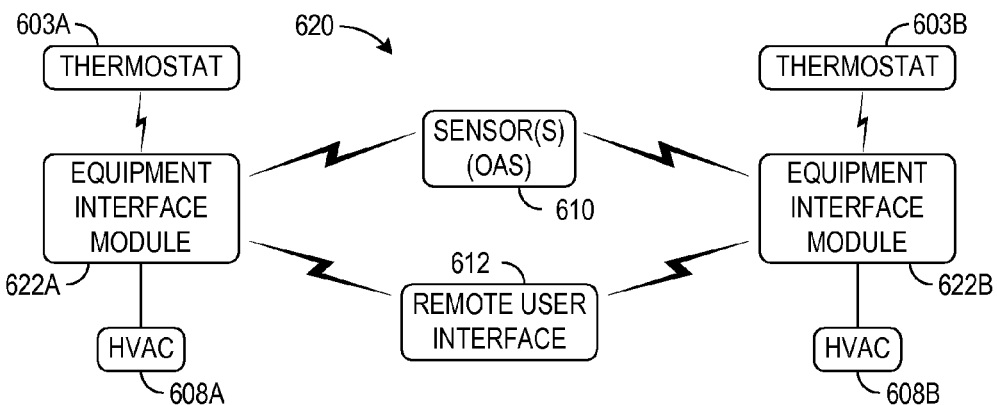
Figure 6C:
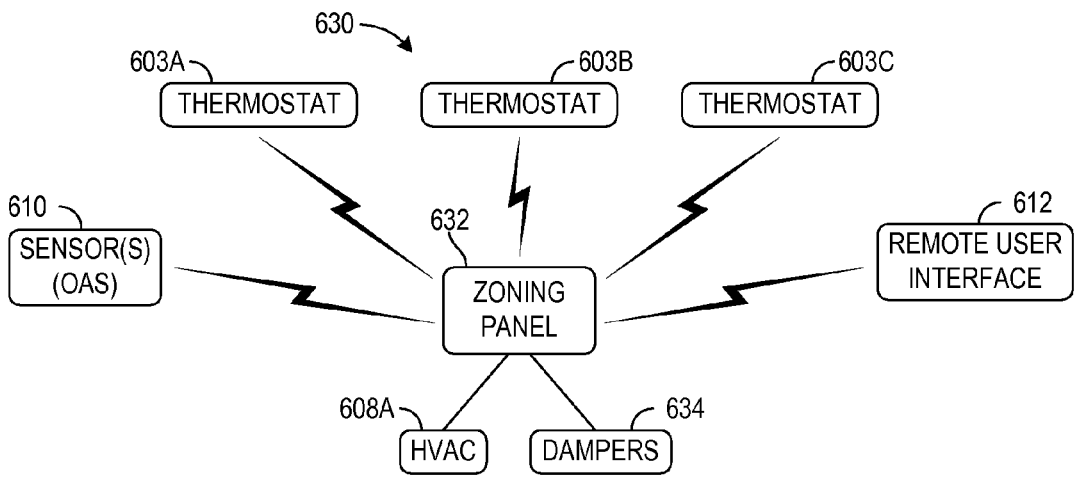

FIGS. 6A-6C depict some representative examples of clients, hosts, groups and systems that benefit from the deployment location generation of random frequency hopping sequence seeds in accordance with the present invention. Like reference numbers are used for analogous devices where appropriate in FIGS. 6A-6C. Each of the devices depicted in FIGS. 6A-6C may be powered in any desired manner, such as via an AC power source, battery or other DC power source, employing energy harvesting such as solar cells, etc. Thus, the examples below that reference possible power sources for various devices are merely representative embodiments for purposes of illustration.

FIG. 6A illustrates one system 600 where one or more thermostats 602A, 602B are configured as hosts, and may be powered by an AC power source, DC source or other power source. Each thermostat may be wired to other equipment such as humidifiers 604A, 604B, dehumidifiers 606A, 606B, and HVAC equipment 608A, 608B. Battery powered "clients" in the embodiment of FIG. 6A include one or more sensors 610, such as an outdoor air sensor (OAS), and one or more remote user interfaces (RUI) 612 which provide users with remote access and control of environmental conditions in the system 600. In accordance with one embodiment of the invention, clients such as the RUI 612 can receive a randomly generated seed value from a host in order to generate the shared frequency hopping sequence.

FIG. 6B illustrates another exemplary system 620 where one or more thermostats 603A, 603B are configured as clients, and may be powered by batteries. Each thermostat 603A, 603B respectively communicates wirelessly with an equipment interface module (EIM) 622A, 622B that may be AC-powered and wired to respective HVAC equipment 608A, 608B. In this embodiment, each EIM 622A, 622B that operates as a host may communicate with various clients. For example, host EIM 622A can communicate wirelessly with clients including the thermostat 603A, the sensor(s) 610, and the RUI(s) 612. Similarly host EIM 622B can communicate wirelessly with clients including the thermostat 603B, the sensor(s) 610, and the RUI(s) 612. In accordance with the invention, clients such as the thermostat 603A can receive a randomly generated seed value from a host in order to generate the shared frequency hopping sequence.

FIG. 6C illustrates another system 630 which utilizes area zoning using a zoning panel 632. In this embodiment, the zoning panel 632 serves as a host that may be AC-powered. The zoning panel 632 of FIG. 6C is connected to other equipment such as the HVAC 608A and dampers 634. Clients include the thermostats 603A, 603B, 603C, a sensor(s) 610, RUI 612, and possibly dampers 634 when such dampers are wirelessly controlled. In accordance with the invention, clients such as any of the thermostats 603A/B/C receive a randomly generated seed value from a host in order to generate the shared frequency hopping sequence.

It should be noted that the exemplary environments described in FIGS. 5 and 6A-6C are provided merely for purposes of facilitating an understanding of representative systems in which the principles of the present invention may be employed. From the description provided herein, one skilled in the art can readily appreciate that the invention may be employed in any system of two or more communicating devices.

The functions associated with the present invention may be performed by discrete circuitry and/or computing system hardware. In one embodiment, the devices that will communicate with one another utilize a processor(s), CPU(s), computer(s), or other processing system to perform the stated functions. It should be understood that reference to a "processor" does not require a single processor or controller chip, but rather refers to the processing circuitry that executes programs to perform the various functions. Alternatively, part or all of the functions may be implemented using discrete circuitry. Accordingly, hardware, firmware, software or any combination thereof may be used to perform the various functions and operations described herein.

An example of a computing arrangement capable of executing programs to perform the various functions described above is shown in FIG. 7. The functional modules used in connection with the invention may reside in any device in which data is to be communicated, such as a host, client or other device. Devices implementing the present invention include thermostats, environmental control devices, local and remote interfaces, and/or other devices that may be used in any system involving the communication of data between devices. Representative examples of such systems include HVAC systems, security systems, area control systems, etc.

Figure 7:
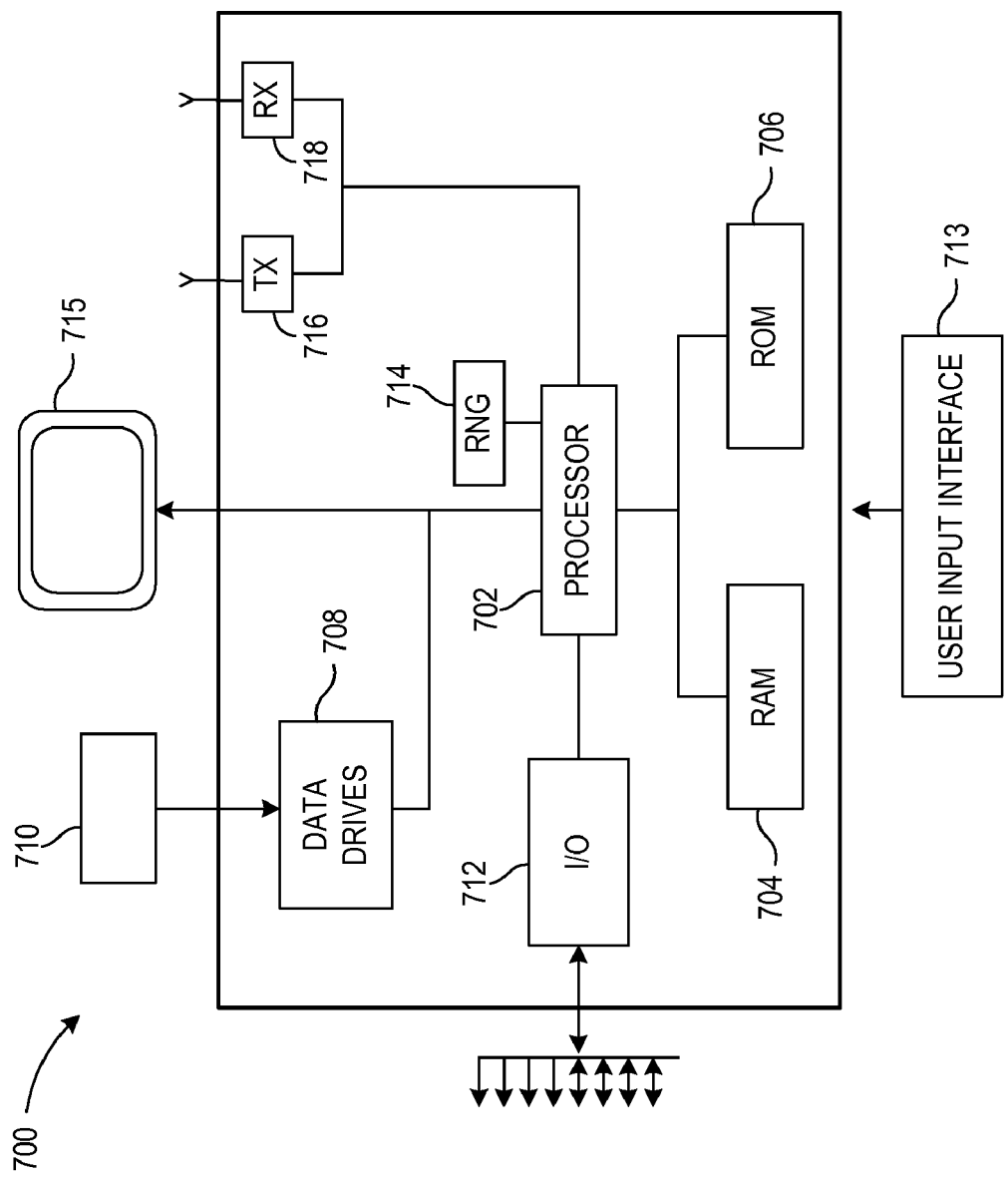
FIG. 7 illustrates a representative computing arrangement capable of executing programs to perform various functions of the invention.

Referring to FIG. 7, the representative computing or processing arrangement 700 includes a processing device(s), such as a central processing unit (CPU) 702. The processor can be configured to execute instructions to perform functions of the present invention. For example, the configured processor can determine and/or activate a mode where a random seed value is calculated, and can calculate the random seed value. The configured processor (whether in a client, host or other device) can also create the frequency hopping sequence based on the seed value. The configured processor can create a hailing message, and can recognize whether responses are received from hailed devices. The configured processor can perform the functions of the timing module, to establish the time in which the processor will monitor for hailing responses. Thus, the processor can be programmed or otherwise configured to perform these and other stated functions described herein. It should be noted that discrete circuits can be used in lieu of or in addition to one or more processors.

The computing system 700 may include storage, such as any one or both of random access memory (RAM) 704, read-only memory (ROM) 706, etc. For example, the generated seed values may be stored in a memory or other storage location. The computing arrangement 700 may instead or additionally include one or more data drives 708, such as disk drives, optical drives and/or other drives capable of receiving programs and/or data on transportable media 710. In one embodiment, software for carrying out the operations in accordance with the present invention may be stored and distributed on such media or other form of media capable of portably storing information. The software may also be transmitted to the computing arrangement 700 via data signals, such as being downloaded electronically via a network.

The processor 702 may communicate with other internal and external components, including removable storage (e.g. FLASH) through input/output (I/O) circuitry 712. I/O circuitry may also communicate control signals, communication signals, and the like. A user input interface 713 may be provided such as a mouse, keyboard/keypad, microphone, touch pad, trackball, joystick, touch screen, voice-recognition system, etc. For example, any such user input interface may be used to enter a sequence generation mode or enrollment mode to initiate the generation of a random seed value. Similarly, a user output device, such as a display 715 or speaker, may also be provided. This may be useful, for example, to show an installer if and when the proper mode is active.

The generation of random seed values can be facilitated by one or more random number generators (RNG). RNGs may be implemented using hardware, software operable in connection with the processor 702, or some combination of hardware and software. An RNG 714 may be integrally programmed as part of the processor 702 operation, or alternatively may be a separate RNG controller 714.

The representative computing arrangement 700 includes a transmitter(s) TX 716 and/or a receiver(s) RX 718. Such TX 716 and RX 718 components may be implemented as discrete components, or aggregated such as in the case of a transceiver. In one embodiment, the TX 716 and/or RX 718 are RF components capable of wirelessly communicating information via radio frequency waves.

Using the description provided herein, the invention may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the invention. As such, terms such as "modules" and the like as used herein are intended to include a processor-executable program that exists permanently or temporarily on any computer-usable medium or in any transmitting medium which transmits such a program. Such "modules" may also be implemented using discrete circuits.

As indicated above, memory/storage devices include, but are not limited to, disks, optical disks, removable memory devices such as smart cards, SIMs, WIMs, semiconductor memories such as RAM, ROM, PROMS, etc. Transmitting mediums in which programs can be provided include, but are not limited to, transmissions via wireless/radio wave communication networks, the Internet, intranets, telephone/modem-based network communication, hard-wired/cabled communication network, satellite communication, and other stationary or mobile network systems/communication links.

The foregoing description of exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined in view of what would be apparent to those skilled in the art from the description provided herein and the claims appended hereto.

What is claimed is:

1. A method comprising:
    entering a sequence generation mode by a host device at its point of operative deployment;
    while in sequence generation mode, generating a random seed value at the host device;
    generating a frequency hopping sequence using the random seed value; and
    determining local uniqueness of the random seed value based on wirelessly transmitting a hail message in the wireless transmission range of the host device to ensure no other devices are utilizing the same random seed value to generate the frequency hopping sequence.

2. The method of claim 1, further comprising receiving one or more responses to the hail message, and in response generating a new random seed value for use in generating the frequency hopping sequence.

3. The method of claim 2, further comprising repeatedly transmitting the hail message and generating a new random seed value until there are no responses to the hail message.

4. The method of claim 1, further comprising receiving no responses to the hail message, and retaining the generated random seed value for use in generating the frequency hopping sequence.

5. The method of claim 1, further comprising transmitting the random seed value to one or more other devices in the host device's intended group of communicating devices for use by the one or more other devices in generating the same frequency hopping sequence.

6. The method of claim 1, wherein entering a sequence generation mode comprises entering the sequence generation mode in response to receiving an input at the host device.

7. The method of claim 1, wherein entering a sequence generation mode comprises entering an enrollment mode during which one or more client devices can enroll for communication with the host device.

8. A method comprising:
    entering a sequence generation mode by a host device at its point of operative deployment;
    while in sequence generation mode, generating a random seed value at the host device;
    generating a frequency hopping sequence using the random seed value;
    re-entering the enrollment mode after the random seed value has been generated;
    determining that the random seed value was previously generated at the host device; and
    bypassing generation of a new random seed value and frequency hopping sequence.

9. The method of claim 1, further comprising additionally using the random seed value as a group identifier to identify a group of communication devices in which the host device is associated.

10. A method comprising:
    generating a first random seed value from which a corresponding frequency hopping sequence may be derived;
    hailing devices within a wireless communication range based on the first random seed value;
    monitoring for any response to the hailing from the hailed devices; and
    generating a second random seed value to replace the first random seed value if any response to the hailing is received from the hailed devices.

11. The method of claim 10, further comprising using the first random seed value to generate a corresponding frequency hopping sequence if no response to the hailing is received from the hailed devices.

12. The method of claim 11, further comprising transmitting the first random seed value to one or more devices.

13. The method of claim 12, further comprising generating a frequency hopping sequence at the one or more devices based on the transmitted first random seed value.

14. The method of claim 10, further comprising using the second random seed value to generate a corresponding frequency hopping sequence.

15. The method of claim 10, wherein generating a first random seed value comprises generating the first random seed value in response to entering an enrollment mode during which one or more client devices can enroll for communication with the host device.

16. The method of claim 10, wherein monitoring for any response to the hailing comprises monitoring for any response to the hailing during an established time duration, and wherein generating the second random seed value if any response is received comprises generating the second random seed value if any response is received before expiration of the established time duration.

17. The method of claim 10, further comprising:
    hailing the devices within the wireless communication range based on the second random seed value;
    monitoring for any response to the hailing from the hailed devices in response to hailing the devices based on the second random seed value; and
    generating a third random seed value to replace the second random seed value if any response to the hailing is received from the hailed devices.

18. The method of claim 17, further comprising using the second random seed value to generate a corresponding hop set if no response message was received from the one or more neighboring systems based on the second random seed value.

19. An apparatus comprising:
    a random seed generation module configured to generate a random seed value at a time of deployment of the apparatus;
    a sequence calculation module configured to generate a frequency hopping sequence that is dependent on the generated random seed value;

a transmitter configured to transmit the generated random seed value; and a response recognition module configured to determine whether the random seed value is unique in the relevant vicinity based on receiving responses to the transmitted generated random seed value, and to cause the random seed generation module to generate a new random seed value if the random seed value is not unique in the relevant vicinity.

20. The apparatus of claim 19, further comprising a mode activation module configured to enter an enrollment mode, and wherein the random seed generation module is coupled to the mode activation module and configured to initiate the generation of the random seed value at the random seed generation module in response to operating in the enrollment mode.

21. A system of communicating devices comprising:
(a) at least one neighboring device comprising:
  a receiver configured to wirelessly receive hail messages communications;
  a transmitter; and
  a processor configured to cause the transmitter to wirelessly transmit responses to the received hail message;
(b) a host device comprising:
  a random seed generation module configured to generate a random seed value at a time of deployment of the host device;
  a message generation module configured to create a hail message based on the generated random seed value;
  a transmitter to wirelessly transmit the hail message;
  a receiver to wirelessly receive any responses to the hail message;
  a response recognition module configured to determine whether any responses to the hail message were received, and to direct the random seed generation module to generate a replacement random seed value if any responses to the hail message were received, wherein the host device creates a frequency hopping sequence based on the random seed or, if any responses to the hail message were received, the replacement random seed.

22. The system of claim 21, further comprising one or more client devices, and wherein the transmitter in the host device is configured to wirelessly transmit the random seed or the replacement random seed to the one or more client devices, depending on whether any responses were received to the hail message.

23. The method of claim 22, wherein each of the one or more client devices comprises a sequence generation module configured to create a like frequency hopping sequence based on the received random seed or replacement random seed.

* * * * *